United States Patent
Dattawadkar

(10) Patent No.: US 9,651,129 B2
(45) Date of Patent: May 16, 2017

(54) CORE RING WITH CUT OR LANCED FEATURES

(71) Applicants: Schaeffler Technologies GmbH & Co. KG, Herzogenaurach (DE); Schaeffler Group USA, Inc., Fort Mill, SC (US)

(72) Inventor: Aditya Dattawadkar, Wooster, OH (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 302 days.

(21) Appl. No.: 14/522,051

(22) Filed: Oct. 23, 2014

(65) Prior Publication Data

US 2015/0125290 A1    May 7, 2015

Related U.S. Application Data

(60) Provisional application No. 61/899,325, filed on Nov. 4, 2013.

(51) Int. Cl.
| | |
|---|---|
| *F16H 41/26* | (2006.01) |
| *F16H 41/28* | (2006.01) |
| *F01D 9/04* | (2006.01) |
| *F01D 25/28* | (2006.01) |

(52) U.S. Cl.
CPC ............ *F16H 41/28* (2013.01); *F01D 9/042* (2013.01); *F01D 25/28* (2013.01); *F16H 41/26* (2013.01); *F16H 2041/285* (2013.01)

(58) Field of Classification Search
CPC ........ F16H 41/26; F16H 41/28; F16H 41/285; F16H 2041/285; F16D 33/18; F16D 33/20; F01D 25/28; F01D 9/041; F01D 9/042; F01D 9/044

USPC .............................. 416/180, 197 C; 29/889.5
See application file for complete search history.

(56) References Cited

U.S. PATENT DOCUMENTS

| | | | |
|---|---|---|---|
| 4,584,835 A | 4/1986 | Nishi | |
| 5,065,509 A | 11/1991 | Sahashi | |
| 5,522,220 A | 6/1996 | Locker | |
| 6,487,855 B1* | 12/2002 | Yoshimoto | F16D 33/18 60/365 |
| 6,769,522 B2* | 8/2004 | Kawamoto | F16H 45/02 192/3.29 |
| 8,056,330 B2 | 11/2011 | Parks et al. | |
| 2004/0172936 A1 | 9/2004 | Mueller et al. | |
| 2009/0013683 A1 | 1/2009 | Parks et al. | |

FOREIGN PATENT DOCUMENTS

JP          2001159457 A2    6/2001

OTHER PUBLICATIONS

International Search Report for PCT/US2014/061989, mailed Feb. 6, 2015 by Korean Intellectual Property Office.

* cited by examiner

*Primary Examiner* — Christopher Verdier
(74) *Attorney, Agent, or Firm* — Kevin L. Parks

(57) ABSTRACT

A core ring for a torque converter comprising: an annular body portion including an inner concave surface, an outer convex surface, an inner circumferential edge, and an outer circumferential edge; a plurality of blade tab slots for receiving a plurality of blades; and at least one positioning element including material protruding axially inward from the inner concave surface to form a tip of the positioning element for aligning a stator. A method for installing a torque converter onto a transmission is also provided.

20 Claims, 7 Drawing Sheets

CORE RING WITH CUT OR LANCED FEATURES

FIELD

The invention relates generally to a core ring in a torque converter, and more specifically to a core ring with positioning elements, which may include cut and/or lanced features, to position the stator during assembly.

BACKGROUND

U.S. Patent Publication No. 2004/0172936, hereby incorporated by reference herein, describes a torque converter, and shows a core ring with blades attached thereto.

U.S. Pat. No. 5,065,509, hereby incorporated by reference herein, describes a method for securing a blade for a torque converter. A plurality of blades are spaced and secured to the surface of a concave shell and a core ring along the circumferential direction of the shell. Tabs fitting through the slots of the shell and the core ring form integrally on the convex and concave periphery of the blades, respectively. Ribs are also formed on the ends of the convex and concave periphery of the blades. Both the convex and concave peripheries are brazed to the shell and the core ring respectively.

U.S. Pat. No. 8,056,330 teaches a core ring including at least two segments.

To install a torque converter into a transmission it is known to align and then engage an input shaft, stator shaft, and pump gear for the transmission to a turbine hub, stator hub, and impeller hub, respectively, for the torque converter. This process can be difficult and time consuming because of the large number of shafts and hubs that must be properly aligned. If the input shaft, stator shaft, or pump gear and the turbine hub, stator hub, or impeller hub are not properly aligned, it is known to rotate one or more of the misaligned elements with respect to each other and then attempt to engage the an input shaft, stator shaft, pump gear, a turbine hub, stator hub, and impeller hub. Torque converter design must hence incorporate features that allow the components to align to enable quick assembly. Previously, the outer diameter of the stator has been centered utilizing a rim of a core ring.

BRIEF SUMMARY

Example aspects broadly comprise a core ring for a torque converter comprising: an annular body portion including an inner concave surface, an outer convex surface, an inner circumferential edge, and an outer circumferential edge; a plurality of blade tab slots for receiving a plurality of blades; and at least one positioning element including material protruding axially inward from the inner concave surface to form a tip of the positioning element for aligning a stator. Other example aspects broadly comprise a core ring wherein the at least one positioning element for aligning the stator is situated entirely between the blade tab slots. Other example aspects broadly comprise a core ring wherein the core ring extends circumferentially about an axis. Other example aspects broadly comprise a core ring wherein the at least one positioning element is a cut feature. Other example aspects broadly comprise a core ring wherein the inner circumferential edge is discontinuous. Other example aspects broadly comprise a core ring wherein the inner circumferential edge is separated into a plurality of areas equal to the number of cut features. Other example aspects broadly comprise a core ring wherein the at least one positioning element is a lanced feature. Other example aspects broadly comprise a core ring wherein the inner circumferential edge is continuous. Other example aspects broadly comprise a core ring wherein the core ring is stamped low carbon steel.

Other example aspects broadly comprise a torque converter comprising: a stator; a core ring (as described at paragraph 6) including the at least one positioning element is situated entirely between the blade tab slots; and, a plurality of blades including respective blade tabs disposed in the core ring blade tab slots. Other example aspects broadly comprise a torque converter wherein the core ring extends circumferentially about an axis. Other example aspects broadly comprise a torque converter wherein the at least one positioning element is a cut feature. Other example aspects broadly comprise a torque converter wherein the inner circumferential edge is discontinuous. Other example aspects broadly comprise a torque converter wherein the inner circumferential edge is separated into a plurality of areas equal to the number of cut features. Other example aspects broadly comprise a torque converter wherein the at least one positioning element is a lanced feature. Other example aspects broadly comprise a torque converter wherein the inner circumferential edge is continuous. Other example aspects broadly comprise a torque converter wherein the core ring is stamped low carbon steel. Other example aspects broadly comprise a torque converter wherein the stator is cast aluminum. Other example aspects broadly comprise a torque converter comprising: a stator and a core ring for supporting a plurality of blades, the core ring including at least one element for centering the stator, each centering element being entirely situated between the blades.

Other example aspects broadly comprise a method for installing a torque converter onto a transmission comprising the steps of: providing a core ring annular body including material protruding axially inward to provide at least one positioning element for aligning a stator including a stator hat, a stator rim, and a stator hub; supporting a plurality of blades on the core ring, wherein the at least one positioning element is located entirely between the blades; aligning the stator by displacing the stator until the stator rim contacts the at least one positioning element; and matingly engaging a stator shaft into the stator hub.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
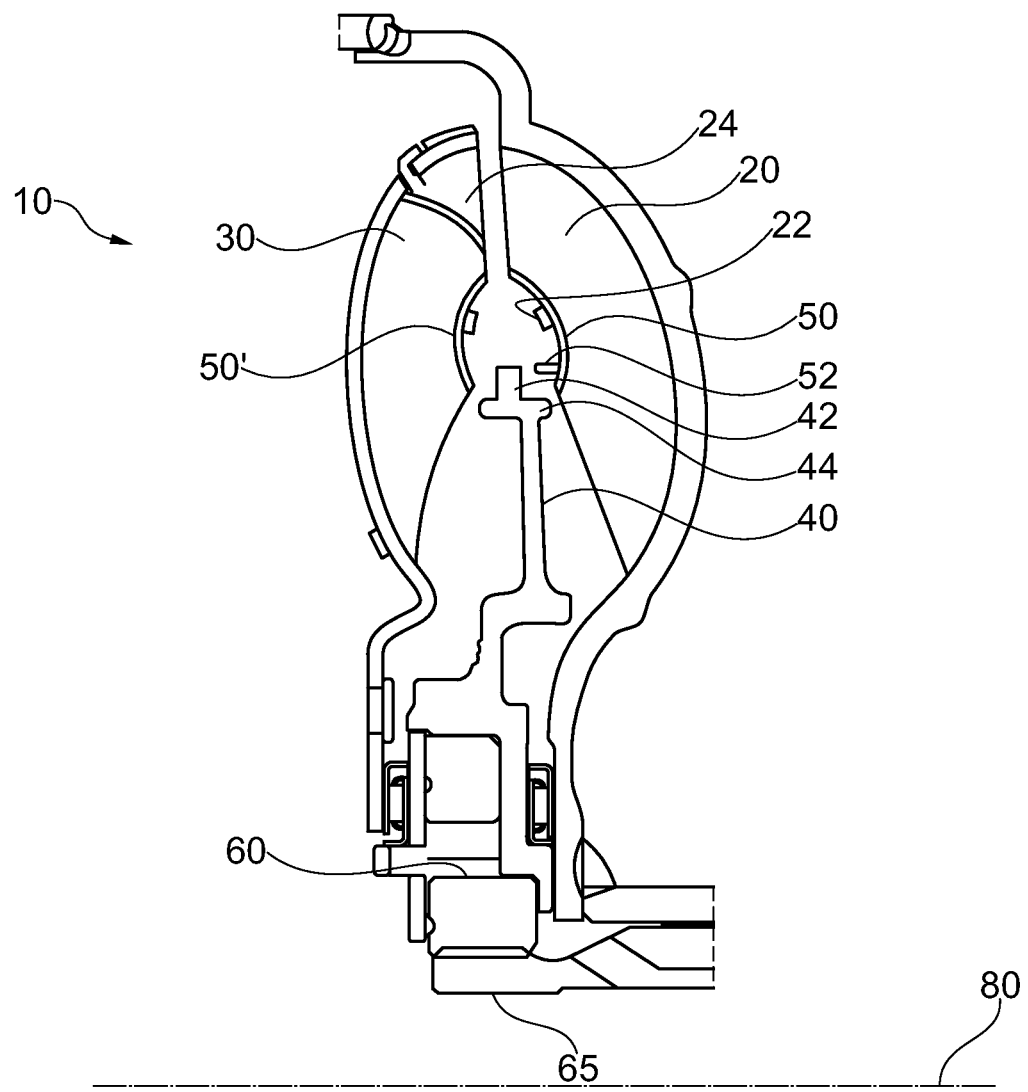
FIG. 1 illustrates a torque converter according to an example aspect.

The following description is made with reference to FIGS. 1-5. FIG. 1 shows in cross section a torque converter 10 having a core ring 50 and a plurality of blades 24. Torque converter 10 includes impeller 20 and turbine 30. Alternatively, core ring 50' is shown, in another example aspect, as the core ring is useful for supporting either turbine blades or impeller blades or both. Blades 24 have tabs 22 extending through slots in core ring 50. Blades are joined after assembly by bending, and fixed to core ring 50 by brazing or welding or by other methods known to those skilled in the art. Core ring 50 extends circumferentially about an axis 80. Known core rings typically have circumferentially-continuous annular bodies. Alternatively, the blade sections themselves form an inner boundary. Here, core ring 50 supporting blades 24 has at least one element for centering or positioning a stator 40.

Stator 40 may be made by any methods known in the art; in one or more embodiments, the stator is cast aluminum. Alternatively, a phenolic stator is used. The stator includes a stator body, a plurality of blades, a stator hat 42, and a stator rim 44. Stator hat 42 typically represents the top portion of a stator and the stator rim 44 is the horizontal region just below the hat. Stator hat 42 is aligned by core ring positioning element(s) 52. Stator 40 includes a stator hub 60, which typically includes internal splines, for matingly engaging during assembly with a stator shaft 65 including external splines. In an example method, a torque converter is installed onto a transmission comprising the steps of: providing a core ring 50 annular body including material protruding axially inward to provide at least one positioning element for aligning a stator 40 including a stator hat 42, a stator rim 44, and a stator hub 60; supporting a plurality of blades on the core ring 50, wherein the at least one positioning element 52 is located entirely between the blades; aligning the stator 40 by displacing the stator until the stator rim 44 contacts the at least one positioning element 52; and matingly engaging a stator shaft 65 into the stator hub 60.

The at least one element for centering or positioning a stator will interchangeably be referred to herein as centering element or positioning element. Positioning elements 52 do not interfere with operational function of the torque converter.

Positioning elements 52 may be employed on core rings supporting impeller blades and/or turbine blades. The at least one positioning element 52 advantageously aligns the stator 40 during assembly by centering the stator with respect to the impeller and/or the turbine. The impeller is also referred to as a pump by those skilled in the art; hence, the terms impeller and pump may be used interchangeably herein.

Prior to assembly, torque converter components including impeller 20 and turbine 30 components have internal freedom of movement. In yet another example aspect, core ring 50 including positioning elements 52 centers the stator 40 with respect to impeller 20, which in turn advantageously centers turbine 30 with respect to the impeller 20.

Figure 2:
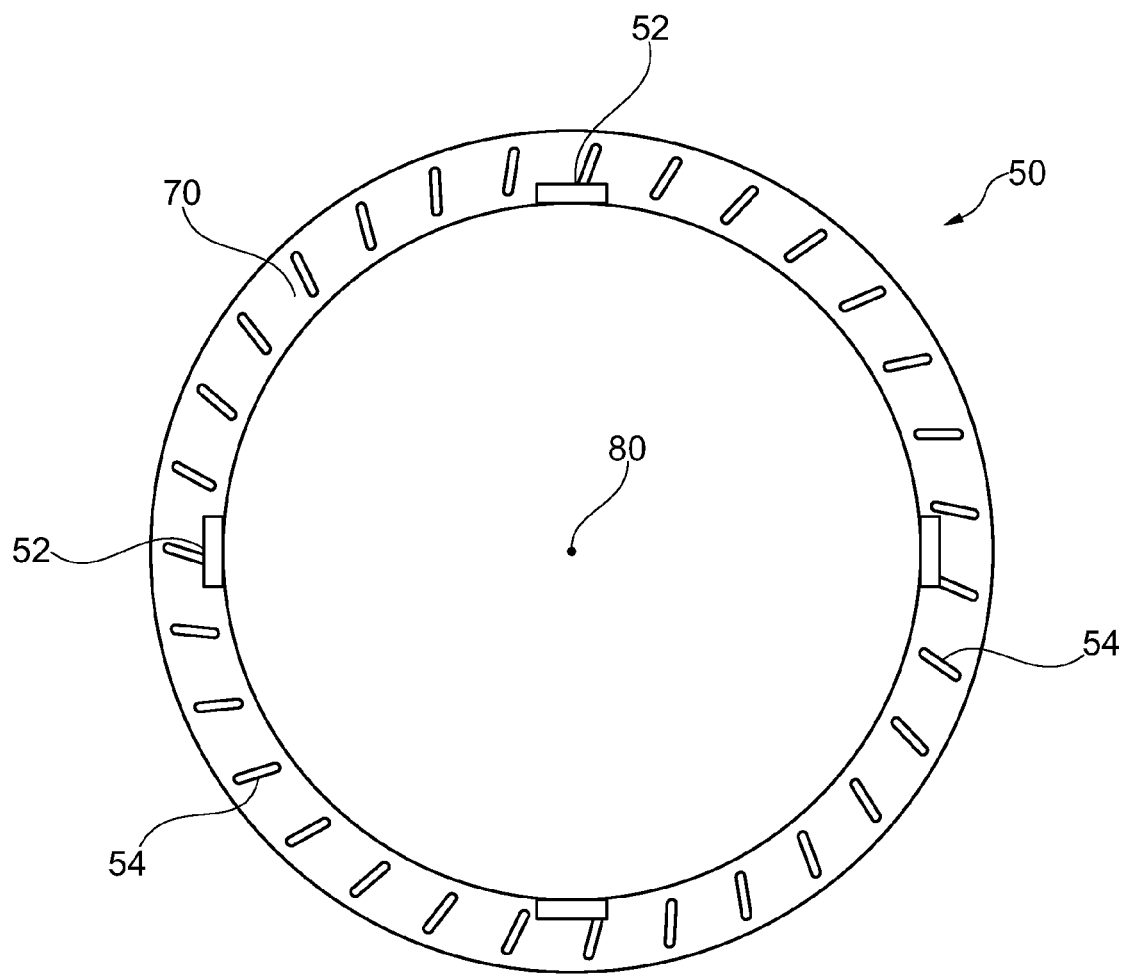
FIG. 2 illustrates a top view of a core ring according to an example aspect.

FIG. 2 illustrates a top view of core ring 50 according to an example aspect, having an inner concave surface 70 and an outer convex surface (not shown). In other words, the inner surface is oppositely disposed with respect to the outer surface. Core ring 50 further comprises a plurality of blade tab slot positions or tab slots 54 for receiving blades or blade tabs. Core ring 50 supports a plurality of blades in the tab slot positions. Core ring 50 further comprises at least one positioning element 52 for aligning the stator, wherein the at least one positioning element is situated entirely between the blade slots. In an example assembly with blades and an outer shell, the positioning element is situated entirely between the blades. The core ring may advantageously be manufactured of a single piece of material, such as formed by stamping or other methods as known in the art; and may be formed from non-limiting examples of materials such as low carbon steel. One material suitable in the forming of core rings according to an example aspect is steel 1018. In an alternative example aspect, the core ring comprises at least two segments as described in U.S. Pat. No. 8,056,330, hereby incorporated by reference herein.

Figure 3A:
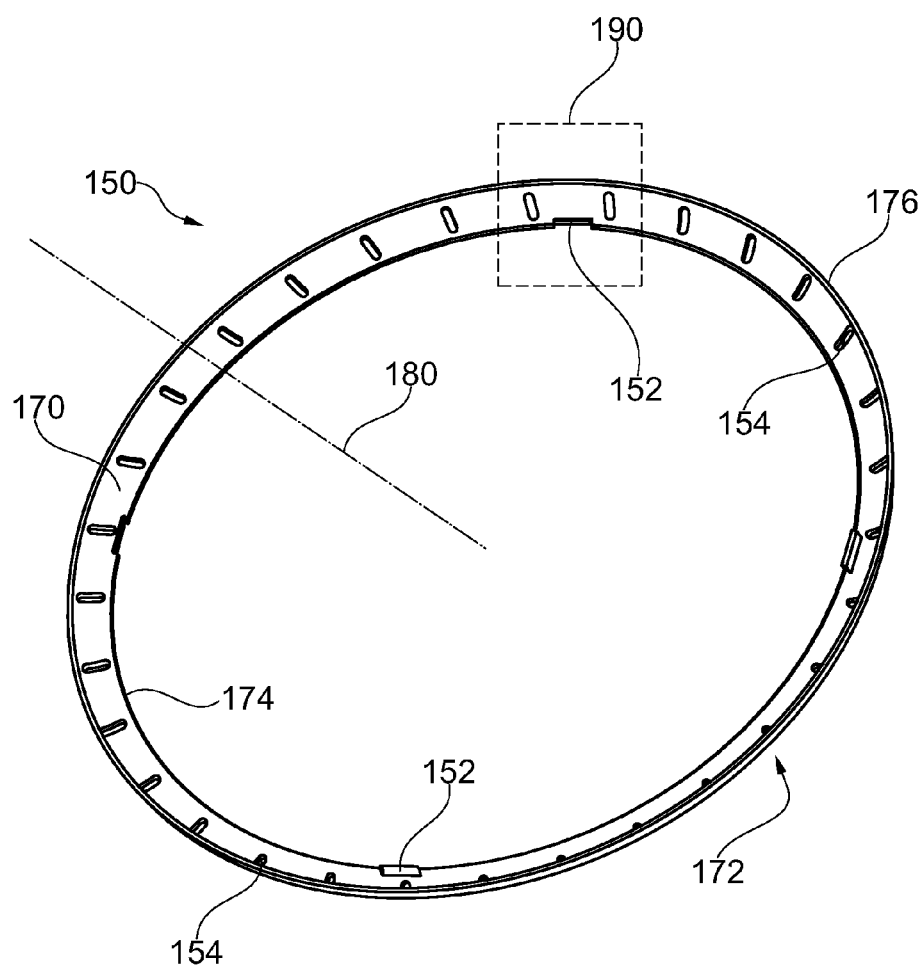
FIG. 3A illustrates a perspective view of a core ring according to an example aspect.
Figure 3B:
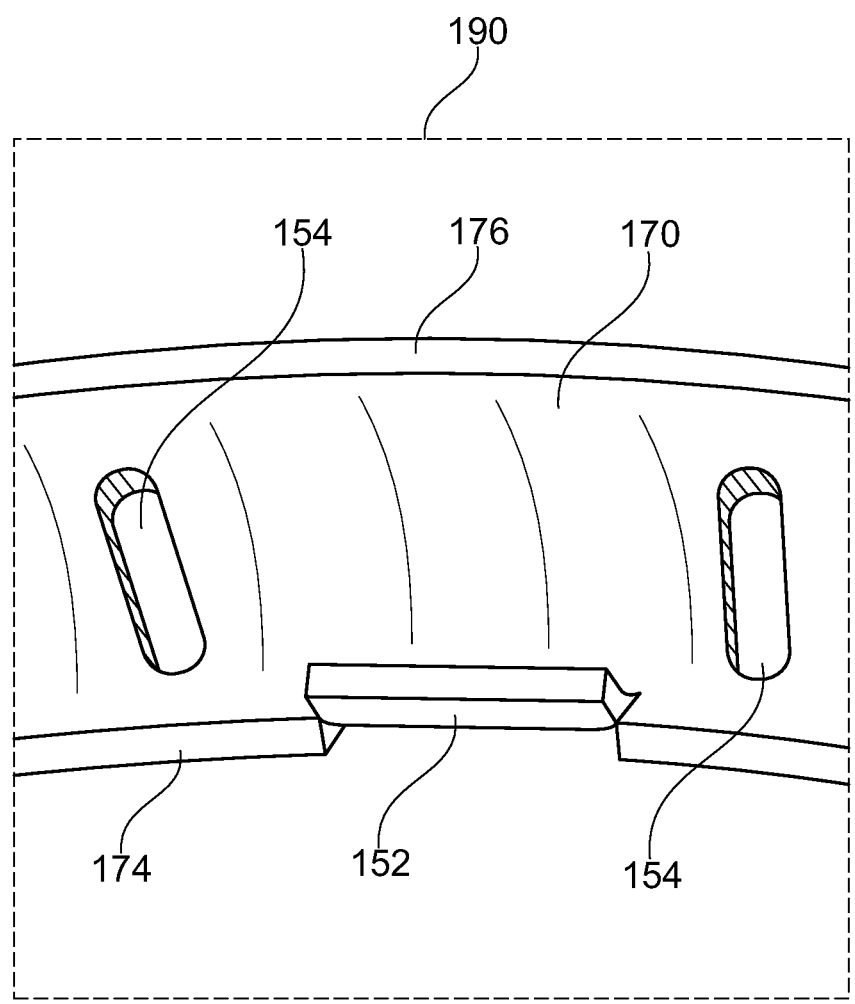
FIG. 3B shows an expanded view of a section of the core ring of FIG. 3A.

Positioning elements may be cut features as shown in greater detail in FIG. 3. The term "cut feature" as used herein is meant to include, but is not limited to, a tab-like extended portion of the core ring protruding inward to provide additional axial width for positioning a stator. FIG. 3A illustrates a perspective view of core ring 150 in accordance with an example embodiment. Core ring 150 extends circumferentially about an axis 180 and includes inner concave surface 170 and outer convex surface 172 (oppositely disposed). Positioning element cut feature 152 protrudes axially inward from inner concave surface 170. In other words, cut feature 152 is core ring material protruding axially inward to provide additional axial width for positioning the stator. Cut features 152 are advantageously positioned between tab slots 154 (for receiving blades). Placement of cut features between the blades ensures that the blades are adequately supported by the core ring. Furthermore, by locating the cut features as such between positioning of blades avoids loss of efficiency during operation and allows the core rings to follow the blade profile more closely. Core ring 150 further includes inner circumferential edge 174 and outer circumferential edge 176, whereby inner circumferential edge 174 is discontinuous at the location(s) of the at least one cut feature 152. The inner circumferential edge 174 of core ring 150 is separated into a plurality of areas equal to the number of cut features. Box 190 indicates the section of core ring 150 shown in expanded view in FIG. 3B.

FIG. 3B illustrates a section of core ring 150, indicated by box 190, including inner concave surface 170 and outer convex surface oppositely disposed, further including inner circumferential edge 174 and outer circumferential edge 176. In an example aspect, cut feature 152 is located entirely between tab slots 154. Inner circumferential edge 174 is discontinuous at the location of cut feature 152.

Figure 4A:
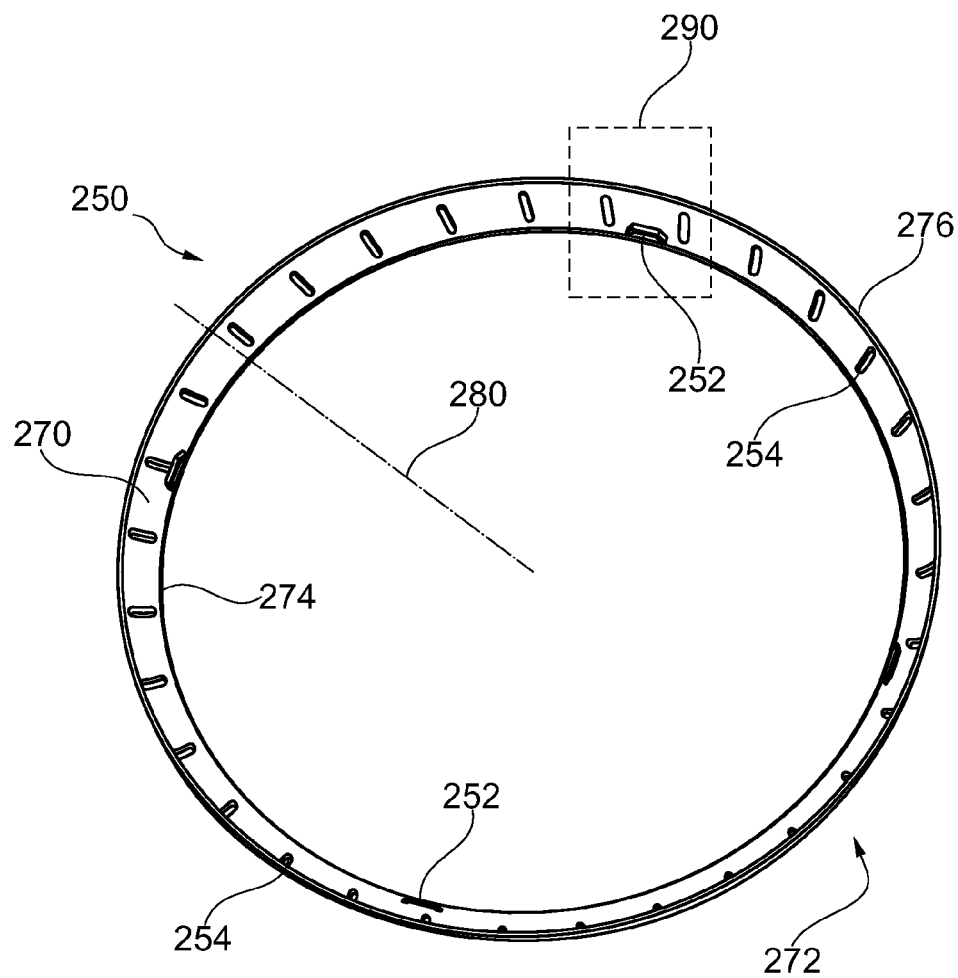
FIG. 4A illustrates a perspective view of a core ring according to an example aspect.
Figure 4B:
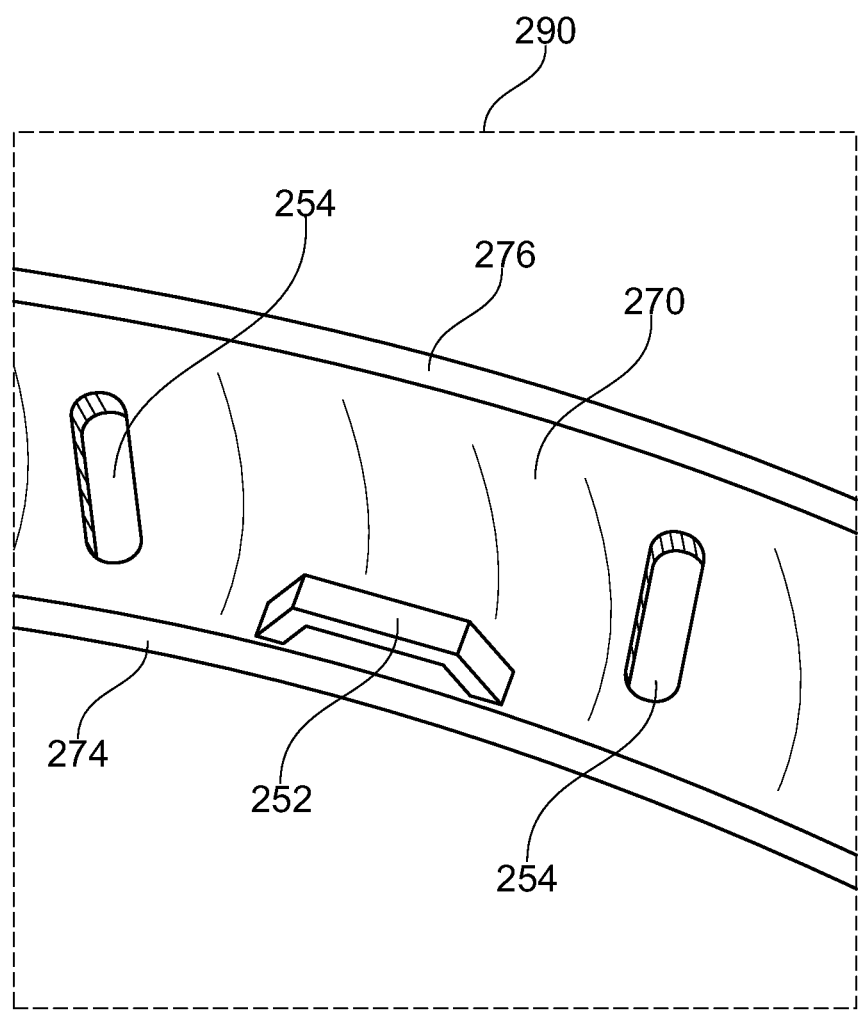
FIG. 4B shows an expanded view of a section of the core ring of FIG. 4A.

Positioning elements may be lanced features as shown in greater detail in FIG. 4. The term "lanced feature" as used herein is meant to include, but is not limited to, a lanced section from within the core ring material thickness protruding inward to provide additional axial width for positioning the stator. FIG. 4A illustrates a perspective view of an inventive core ring 250 in accordance with an example embodiment. Core ring 250 extends circumferentially about an axis 280 and includes inner concave surface 270 and outer convex surface 272. Lanced feature 252 protrudes axially inward from inner concave surface 270. In other words, the lanced feature is core ring material protruding axially inward to provide additional axial width for positioning the stator. Lanced features 252 are advantageously positioned between tab slots 254 (for receiving blades). Placement of lanced features between the blades ensures that the blades are adequately supported by the core ring. Furthermore, by locating the lanced features as such between positioning of blades avoids loss of efficiency during operation and allows the core rings to follow the blade profile more closely. Core ring 250 further includes inner circumferential edge 274 and outer circumferential edge 276, whereby inner circumferential edge 274 is continuous including at the location(s) of the at least one lanced feature(s) 252. Lanced features 252 are formed within inner concave surface 270 and therefore inner circumferential edge 274 is continuous. Box 290 indicates the section of core ring 250 shown in expanded view in FIG. 4B.

FIG. 4B illustrates a section of core ring 250, indicated by box 290, including inner concave surface 270 and outer convex surface 272 oppositely disposed, further including inner circumferential edge 274 and outer circumferential edge 276. Lanced feature 252 is located entirely between tab slots 254. Inner circumferential edge 274 is continuous.

Figure 5:
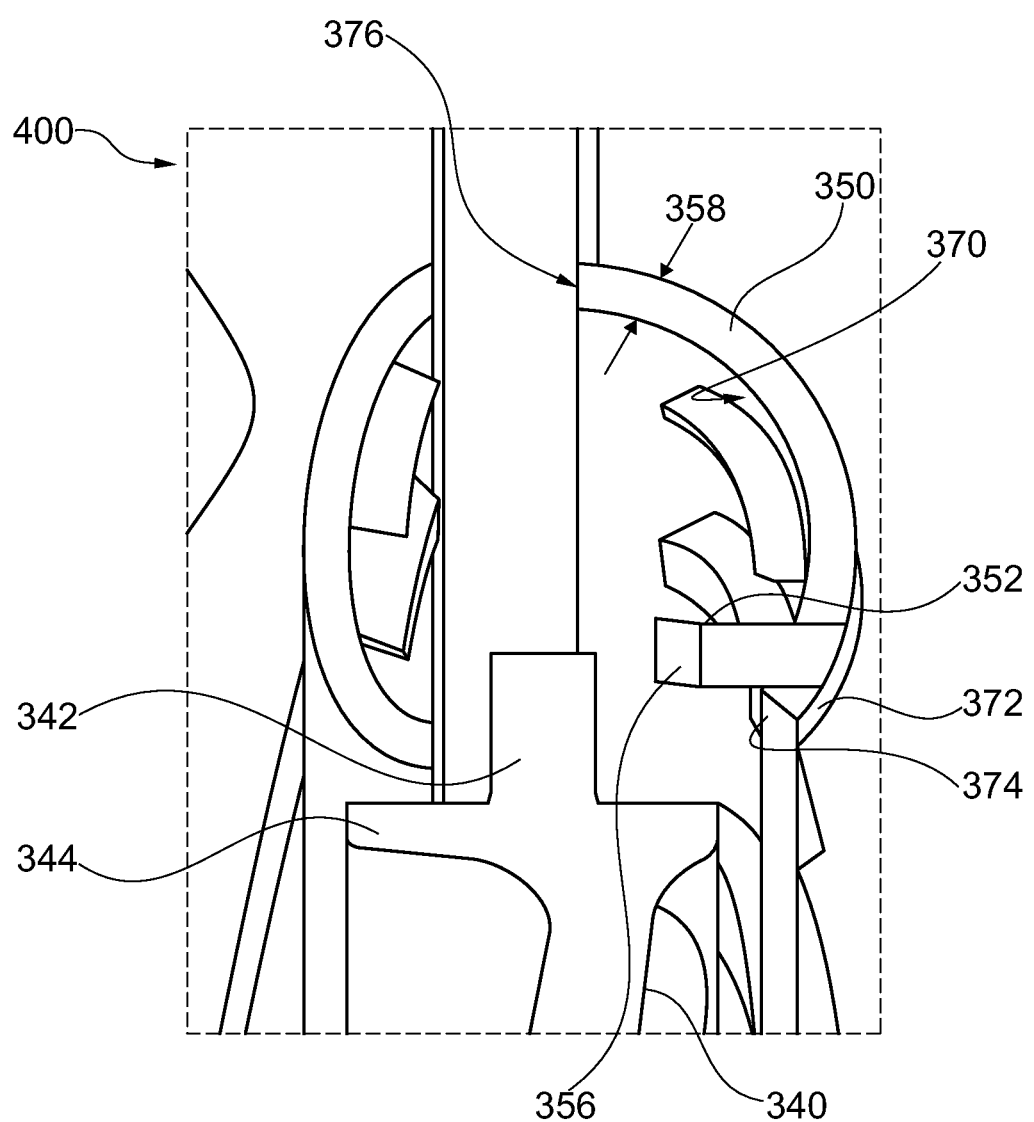
FIG. 5 illustrates a cross-sectional view of a core ring and stator assembly according to an example aspect.

During assembly and before a stator shaft is installed, the inner parts of the torque converter have freedom of movement. FIG. 5 is a cross-sectional view of a core ring and stator assembly 400 as in accordance with an example aspect. Core ring 350 includes inner concave surface 370 and outer convex surface 372, further including inner circumferential edge 374 and outer circumferential edge 376. Lanced feature 352 includes tip of lanced feature 356. Stator 340 including stator hat 342 and stator rim 344 is centered during assembly so that radial displacement of the stator rim 344 is limited by contact with lanced feature 352 including tip 356. The positioning element, or lanced feature in this non-limiting example, limits movement or slippage of the stator typically known to cause misalignment. The at least one positioning element(s) keep the stator 'centered' or in proper alignment for subsequent insertion of the stator shaft (refer to FIG. 1). Therefore the at least one positioning element or lanced feature 352 is a means to prevent the stator from moving off center.

As those skilled in the art appreciate, the thickness of the core ring wall or core ring wall thickness 358, in other words the material thickness between and including inner concave surface 370 and outer convex surface 372, is advantageously reduced if desired in an example core ring design. Positioning elements 352, which may include non-limiting examples of cut features and lanced features, provide the axial width necessary for positioning the stator during assembly of the torque converter onto the transmission. In an example aspect, a torque converter comprises a stator and a core ring for supporting a plurality of blades. The core ring includes at least one element for centering the stator, each centering element being entirely situated between the blades.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A core ring for a torque converter comprising:
   an annular body portion including:
      an inner concave surface;
      an outer convex surface;
      an inner circumferential edge; and
      an outer circumferential edge;
   a plurality of blade tab slots for receiving a plurality of blades; and
   at least one positioning element disposed radially outward of the inner circumferential edge and including material protruding axially inward from the inner concave surface to form a tip of the positioning element for aligning a stator.

2. The core ring as in claim 1 wherein the at least one positioning element for aligning the stator is situated entirely between the blade tab slots.

3. The core ring as in claim 1 wherein the core ring extends circumferentially about an axis.

4. The core ring as in claim 1 wherein the at least one positioning element is a cut feature.

5. The core ring as in claim 4 wherein the inner circumferential edge is discontinuous.

6. The core ring as in claim 5 wherein the inner circumferential edge is separated into a plurality of areas equal to the number of cut features.

7. The core ring as in claim 1 wherein the at least one positioning element is a lanced feature.

8. The core ring as in claim 7 wherein the inner circumferential edge is continuous.

9. The core ring as in claim 1 wherein the core ring is stamped low carbon steel.

10. A torque converter comprising:
    the stator;
    the core ring of claim 1 including the at least one positioning element situated entirely between the blade tab slots; and,
    a plurality of blades including respective blade tabs disposed in the core ring blade tab slots.

11. The torque converter as in claim 10 wherein the core ring extends circumferentially about an axis.

12. The torque converter as in claim 11 wherein the at least one positioning element is a cut feature.

13. The torque converter as in claim 12 wherein the inner circumferential edge is discontinuous.

14. The torque converter as in claim 13 wherein the inner circumferential edge is separated into a plurality of areas equal to the number of cut features.

15. The torque converter as in claim 11 wherein the at least one positioning element is a lanced feature.

16. The torque converter as in claim 15 wherein the inner circumferential edge is continuous.

17. The torque converter as in claim 10 wherein the core ring is stamped low carbon steel.

18. The torque converter as in claim 10 wherein the stator is cast aluminum.

19. A torque converter comprising: a stator and a core ring for supporting a plurality of blades, the core ring including at least one element for centering the stator, each centering element being entirely situated between the blades.

20. The torque converter as in claim 19 wherein the at least one centering element is a cut or lanced feature.

* * * * *